J. W. Maloy,
Dressing Stone.
No. 58,853.          Patented Oct. 16, 1866

Witnesses
David Kelleher
G. A. C. Smith

Inventor
J. W. Maloy
by G. H. Adams
Atty.

UNITED STATES PATENT OFFICE.

JAMES W. MALOY, OF BOSTON, MASSACHUSETTS.

MACHINE FOR CUTTING GRANITE.

Specification forming part of Letters Patent No. 58,853, dated October 16, 1866.

*To all whom it may concern:*

Be it known that I, JAMES W. MALOY, of Boston, in the county of Suffolk and State of Massachusetts, have invented a new and useful Improvement in Machines for Dressing and Finishing Marble, Granite, and other similar substances, of which the following is a full, clear, and exact description, reference being had to the accompanying drawings, making a part of this specification, in which—

Figure 1:
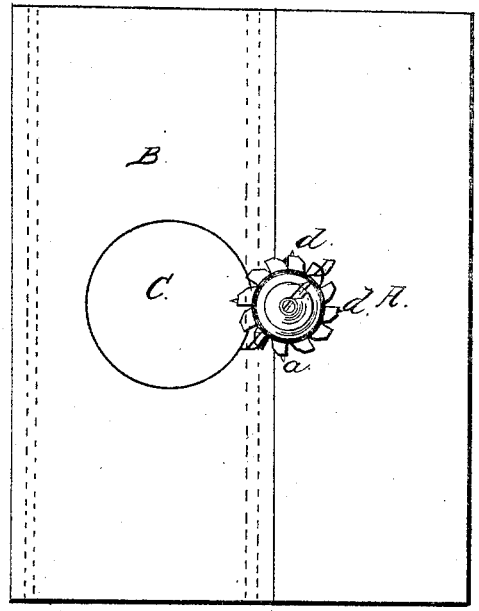
Figure 2:
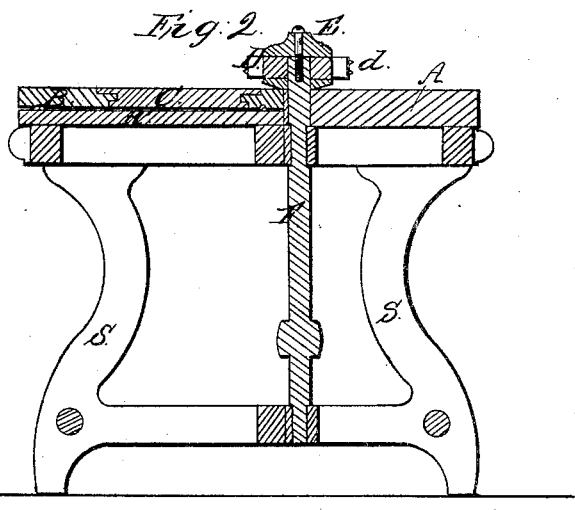

Figure 1 represents a plan view, and Fig. 2 a transverse vertical section.

Similar letters indicate like parts in the several figures.

My invention relates to certain improvements upon a machine for cutting and finishing marble for which a patent was granted to me on April 10, 1866; and the invention consists in a revolving circular table or disk set into the sliding or feeding table upon which the material to be operated upon is placed.

Referring to the drawings, A' A S S represent a table or frame, the part designated by A A' being fixed, and that marked B forming a sliding table or platform of even surface with the part marked A, and resting on ways, so as to have an easy longitudinal motion. The marble or stone to be dressed is supported upon the platform B, and is fed to the tool D by the motion of the said platform. C represents a circular disk set into the table B in such a manner as to admit of its being freely rotated, its surface being flush with that of the table B, the object of which is to allow of the stone, in the operation of dressing, to present its edges on a curve to the action of the tool or cutter D. F represents a vertical shaft properly supported within the frame and extending above the table A. On the upper end of the shaft F is a finishing-tool, D, formed with points or teeth, as shown in Fig. 1. The tool or cutter is properly secured to the shaft by means of a washer, E, and screw. In the outer edges of the teeth of the cutter are secured diamonds *d*, of which there may be one or more on each tooth, as required. By means of these diamonds I am enabled to dress or finish the hardest kind of stone.

In the operation of my machine the shaft is put in motion by any convenient power by which a rotary motion is imparted to the cutter. The sliding table or platform may at the same time have a longitudinal motion imparted to it by hand or by any suitable connection with the machinery by which the material to be dressed is fed to the tool; or, the sliding platform B being stationary, the cutter may be made to operate upon the material as it rests upon the circular disk C in dressing a curved edge of the material.

Having thus described my invention, what I claim as new, and desire to secure by Letters Patent, is—

1. The combination of the revolving circular disk C with the sliding portion B of the table, as and for the purpose specified.

2. The combination of the sliding table B, revolving disk C, and tool D, when constructed and operating substantially as set forth.

In testimony whereof I have signed my name to this specification in the presence of two subscribing witnesses.

JAMES W. MALOY.

Witnesses:
J. H. ADAMS,
DAVID KELLEHER.